July 15, 1969 J. DECHELOTTE 3,456,132

MEASUREMENT CONVERSION DEVICE FOR PRODUCING A VOLTAGE WHICH IS PROPORTIONAL TO A DISPLACEMENT AND APPLICATIONS OF SAID DEVICE

Filed Oct. 20, 1966 5 Sheets-Sheet 1

INVENTOR

JEAN DECHELOTTE

By Young + Thompson

ATTYS.

INVENTOR
JEAN DECHELOTTE
BY Young + Thompson
ATTYS.

INVENTOR

JEAN DECHELOTTE

BY Young & Thompson

ATTYS.

INVENTOR
JEAN DECHELOTTE
BY Young & Thompson
ATTYS.

INVENTOR
JEAN DECHELOTTE
BY Young & Thompson
ATTYS.

3,456,132

MEASUREMENT CONVERSION DEVICE FOR PRODUCING A VOLTAGE WHICH IS PROPORTIONAL TO A DISPLACEMENT AND APPLICATIONS OF SAID DEVICE

Jean Dechelotte, Ergal, Jouars-Ponchartrain, Yvelines, France

Filed Oct. 20, 1966, Ser. No. 588,168
Claims priority, application France, Oct. 26, 1965, 36,195
Int. Cl. H03k 1/02
U.S. Cl. 307—296 12 Claims The present invention relates to an electromechanical device for producing an alternating-current or direct-current voltage, the value of which is proportional to the displacement of a moving component relatively to a reference position, this result being achieved largely irrespective of any variations in external conditions which may affect the device (such as modifications of ambient temperature or especially of supply voltages).

The invention also extends to the industrial applications of the device under consideration and especially in the field of measurements, the aforesaid moving component being in that case actuated by the responsive element of a measuring instrument.

In accordance with the invention, the measurement conversion device for producing a voltage which is proportional to the displacement of a moving component relatively to a reference position is mainly characterized in that it comprises a differential transformer comprising at least three pairs of windings which are inductively coupled by means of a moving magnetic core whose position is controlled by the moving component aforesaid, a first pair of windings of said transformer being associated respectively with an oscillating circuit and with a circuit for sustaining the oscillations of an oscillator system, a second series-connected pair of windings being adapted to supply a voltage which is independent of the travel of the core and which is opposed to an input voltage applied to the device, the third pair of windings which is connected in opposition and influenced differentially by the magnetic core as a function of its position being adapted to deliver an output voltage which is proportional to the product of the input voltage and of the displacement of the core relatively to the reference position thereof and which is practically independent of any variations which might affect the other elements of the device.

Preferably, the three pairs of windings have different arrangements relatively to the moving magnetic circuit of the transformer. Thus, the windings which are associated with the oscillator are mounted in such a manner that their coupling is not influenced by the displacements of the moving core.

On the contrary, the two pairs of windings which are influenced differentially by the magnetic core as a function of its position are disposed symmetrically on each side of the reference position of this latter and in the vicinity of the ends of said core when it takes up the reference position, it being assumed that the transformer has a tubular volume and an axially moving core.

It is thus possible to construct a measurement converter which has a small volume and high responsiveness.

If the control movement is angular instead of being rectilineal, provision is made according to the invention for the use of a rotating core transformer as a transducer system.

According to an alternative form of the invention, the input signal is constituted by an electric measurement signal, with the result that the output signal is proportional to the product of said measurement signal and of the displacement of the core.

It is thus possible to associate in cascade a number of different measurement converters in accordance with the invention and to collect an output signal corresponding to a complex function of a number of parameters whether of electrical or mechanical nature.

One application of the invention which is therefore of interest is the provision of a flow meter for measuring real flow or mass flow.

Further properties and advantages of the invention will become apparent from the description which follows below, reference being had to the accompanying drawings which are given solely by way of example and not in any limiting sense, and in which.

Figures 8, 9:
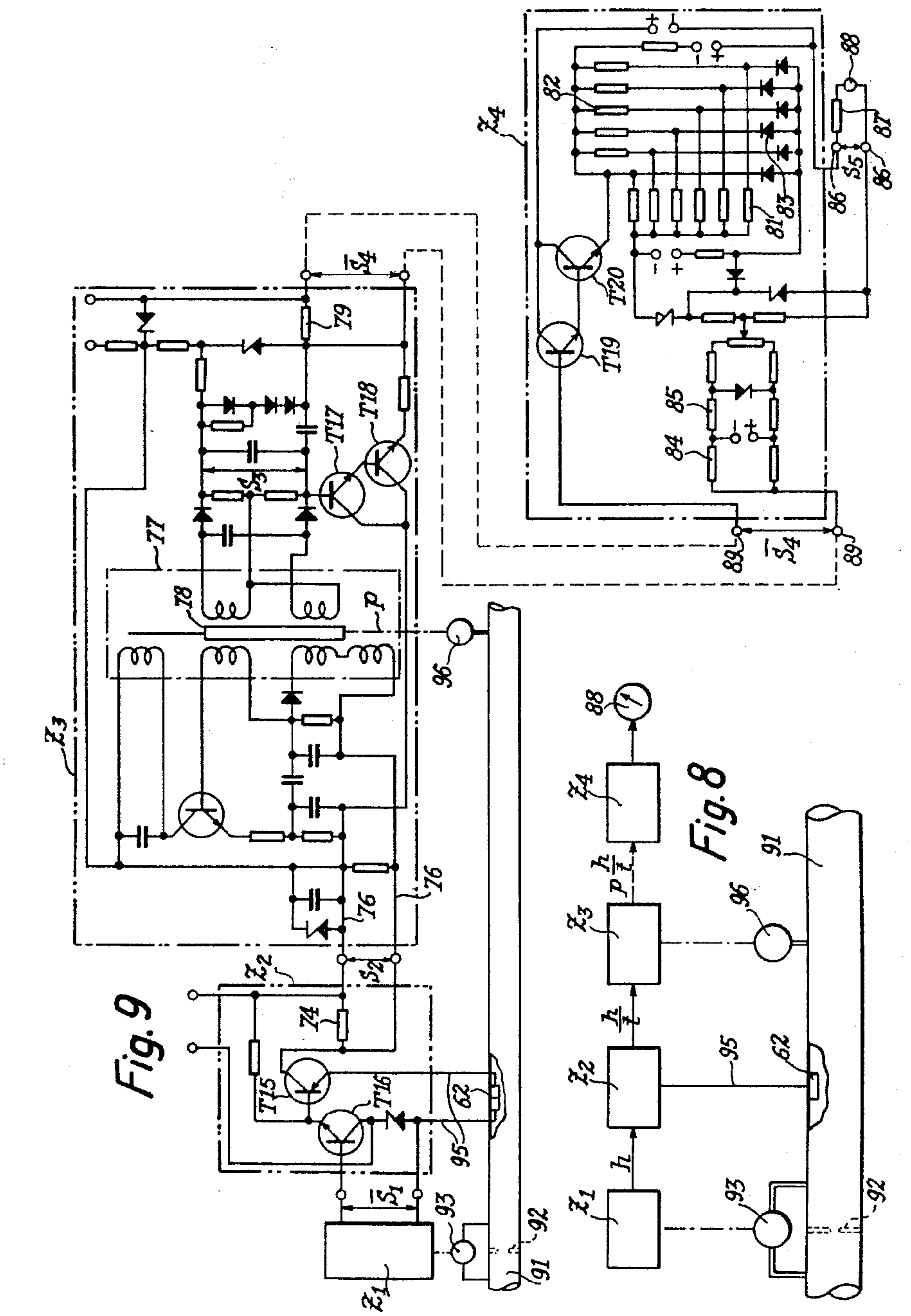
FIG. 8 is a block diagram showing the utilization of the measurement converter as a flow meter for measuring mass flow.
FIG. 9 is a more detailed diagram corresponding to FIG. 8.
Figure 10A:
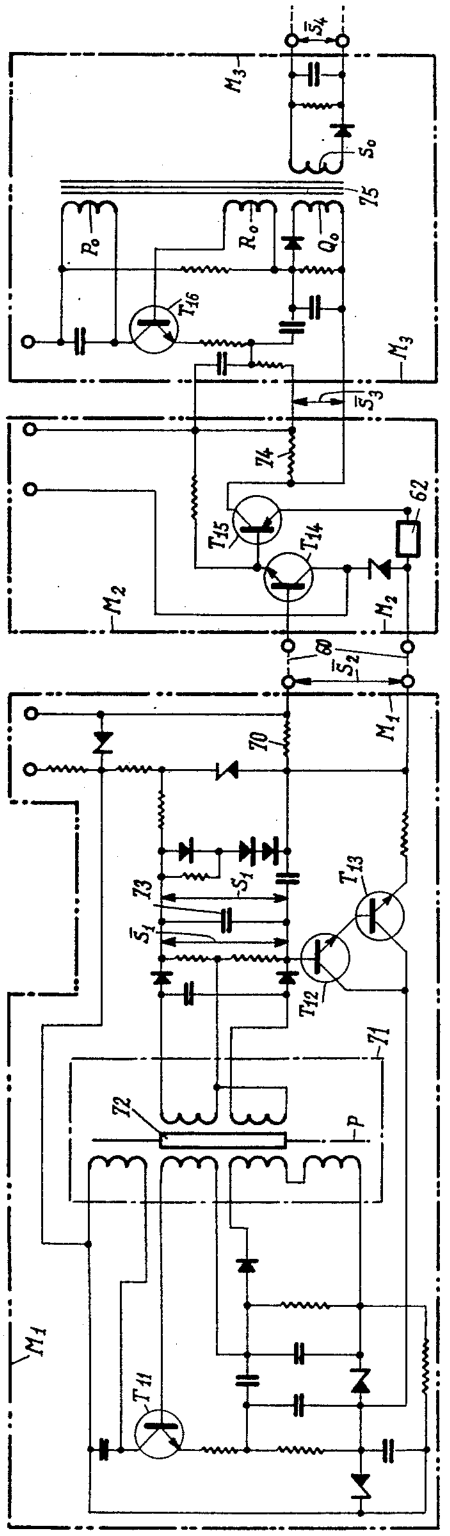
Figure 10B:
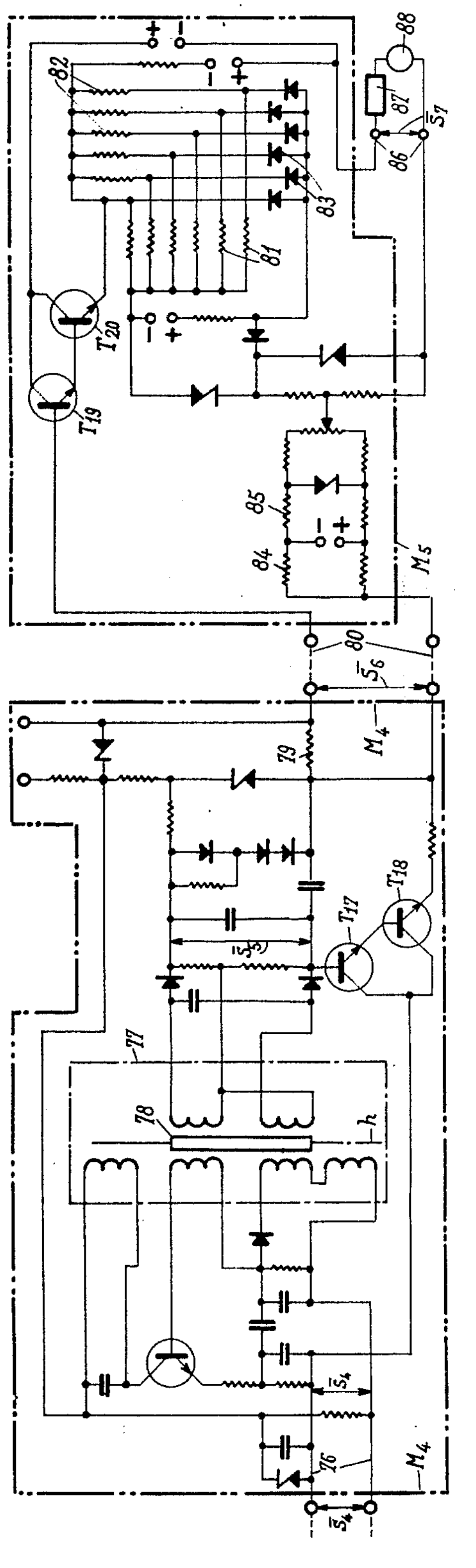

FIGS. 10*a*, 10*b* are diagrams of another circuit arrangement in accordance with FIG. 8.

Figure 1:
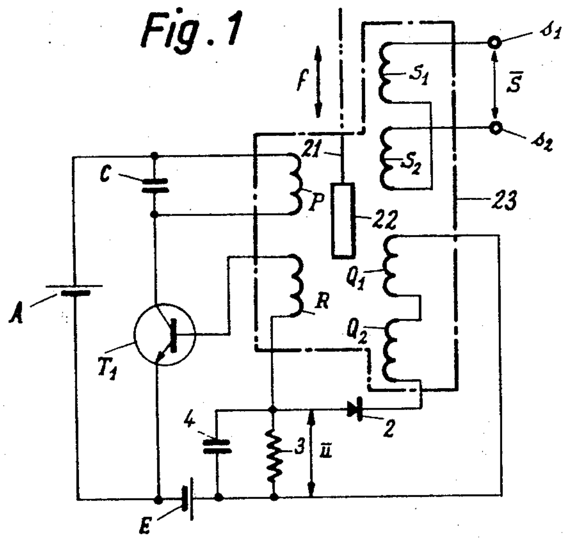
FIG. 1 is a simplified diagram of a device according to the invention.

The device which is illustrated in FIG. 1 is intended to deliver between the output terminals $s_1$, $s_2$ an output voltage $\overline{S}$ which is proportional to the displacements in the direction *f* of a moving component such as a rod 21 which can be actuated by any external means and, for example, by the responsive element of a measuring instrument which has not been shown in the drawings.

To this end, the rod 21 is coupled to the moving magnetic core 22 of a differential transformer 23 having a number of inductive windings coupled to each other by means of said core in accordance with an arrangement which is partly known as disclosed in French Patent No. 1,444,885, the known features of this circuit system being included in the present application by way of reference.

More specifically, the transformer 23 comprises three pairs of windings P, R, $Q_1$ and $Q_2$, $S_1$ and $S_2$. The windings P and R are so designed in the present form of execution that the coupling thereof is unaffected by the displacements of the core 22. (One method of obtaining this result will be described in reference to FIG. 2). The winding P is associated with a capacitor C for the purpose of constituting an oscillating circuit which is supplied from the direct-current source A and is connected to the collector of an oscillator transistor $T_1$, the emitter of which is connected to the source A.

The base of the transistor $T_1$ is connected to the winding R. The windings P and R are magnetically coupled by means of the core 22, thereby sustaining the oscillations.

The regulating circuit comprises the windings $Q_1$, $Q_2$ which are connected in series and coupled magnetically by means of the core 22. Said windings serve to supply a detection system comprising a rectifier 2, a load resistor 3 and a smoothing capacitor 4. The voltage *u* which is detected at the terminals of the resistor 3 is opposed to the input voltage $\overline{E}$ supplied by a source E which may, for example, be a direct-current source. The windings are preferably identical and placed symmetrically with respect to the central position of the core 22 taken as a reference (which is not apparent from the figure), the arrangement being such that, in the event of displacement of the core 21, the voltage induced in one of the windings increases and decreases in the other winding by values which are proportional to said displacement.

The pair of windings $S_1$, $S_2$ is disposed relatively to the core in such a manner as to exhibit the same property. On the other hand, these windings are mounted in opposition so that the resultant output voltage $\overline{S}$ is the differential voltage.

When the circuit is connected-up and the controlled oscillator comprising the transistor $T_1$ is turned on, the windings P and R cause a substantially sinusoidal alternating-current flux to circulate through the core 22, thereby inducing an E.M.F. in the other windings $Q_1$, $Q_2$ and $S_1$, $S_2$. When the core 22 is located at the center of the differential transformer 23, the voltages induced in the windings $Q_1$, $Q_2$ are equal and added whilst those which are induced within the windings $S_1$, $S_2$ are subtracted. Inasmuch as these voltages are also equal, the output voltage $\overline{S}$ is zero. The corresponding position of the core 22 can be considered as the origin or zero position of the displacement.

If the core 22 moves under the action of the rod 21 either to one side or the other of the zero position, the voltage rises in one of the windings $Q_1$ or $Q_2$ but drops in the other, with the result that the resultant voltage $\overline{Q}$ remains constant. Similarly, the induced voltage increases in one of the windings such as the winding $S_1$ and decreases in the other windings $S_2$. However, inasmuch as these windings are connected in opposition, a signal $\overline{S}$ appears between the terminals $s_1$ and $s_2$. Inasmuch as the voltage $\overline{Q}$ is constant, the voltage $\overline{S}$ is not dependent thereon.

By means of a suitable choice of size of the core and of the differential transformer windings and also by virtue of their respective design, steps can be taken to ensure that the voltage $\overline{S}$ is proportional to the displacement D$x$ of the core 22, this property being controlled by means of preliminary tests.

In accordance with one characteristic feature of the circuit arrangement under consideration which can readily be explained, the voltage $\overline{S}$ is proportional to the input voltage $\overline{E}$ which is supplied from the source E.

Under these conditions, the law of response of the device is $$\overline{S}=k.\overline{E}.Dx$$

wherein $k$ designates a constant.

In particular, and by virtue of the properties attached to this circuit arrangement, it is thus possible to eliminate the variations of the source A as well as the variations in resistance of the different windings under the effect of temperature variations. The response of the measurement conversion device is therefore both proportional to the displacement and independent of any variations which might affect the physical parameters of the circuit.

Provision is accordingly made for two particular modes of application of the measurement conversion device:

Either as a system for multiplying two quantities, one quantity being an electrical value corresponding to a variable voltage $\overline{E}$ which can thus constitute one of the measurable variables whilst the other quantity is a displacement D$x$. One example of an application of this nature will be given hereinafter in connection with the measurement of mass flow;

Or as a system for the analog measurement of a displacement D$x$, the voltage $\overline{E}$ being in that case maintained constant and supplied by a calibration cell, a Zener diode or like means.

Figure 2:
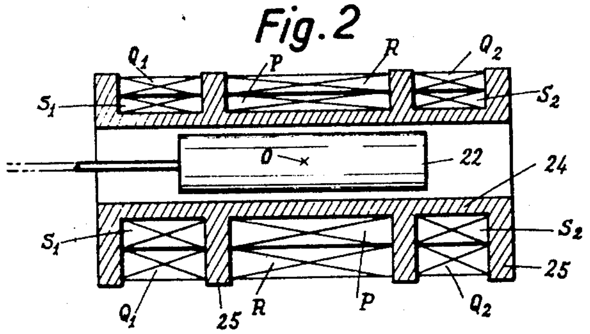
FIG. 2 is a diagrammatic axial sectional view of a differential transformer for the device of FIG. 1.

In practice, the differential transformer 23 can be constructed as shown diagrammatically in FIG. 2 by means of superposed coaxial windings carried by an insulating tubular sleeve 24 and separated by cheeks 25. The arrangement of the coil units is such that the windings $Q_1$, $Q_2$ or $S_1$, $S_2$ of a same pair are located at comparable radial distances from the axis of sliding motion of the core 22 and disposed symmetrically with respect to the center 0 of the core 22 which is assumed to be in a rest position, these windings being also placed in such a manner that a slight displacement of the core 22 results in a substantial variation in the reluctance of the circuit.

Figure 3:
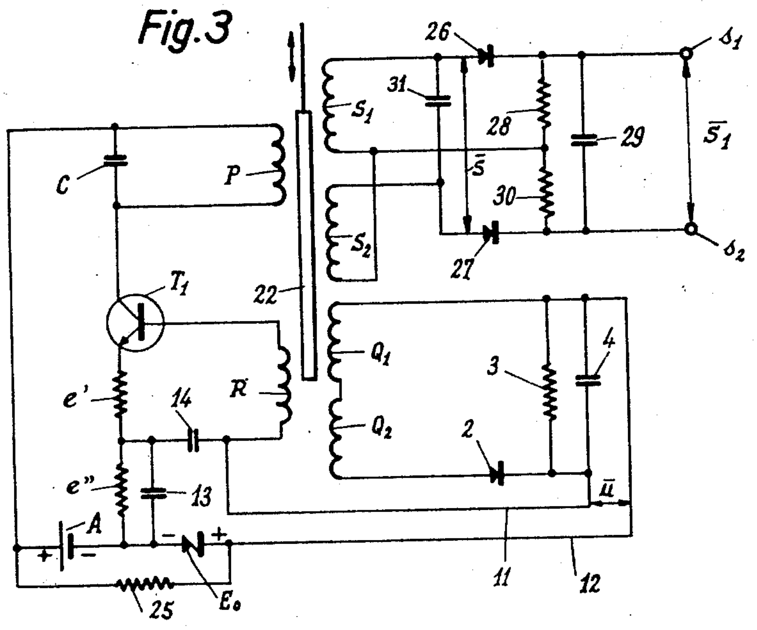
FIG. 3 is a diagram of an improved arrangement of the measurement conversion device.

One advantageous form of execution of the device according to the invention is shown in FIG. 3, wherein the components which are similar to those of FIG. 1 are given the same reference numerals.

In this example, two resistors are inserted in the circuit of the emitter of the transistor 1. The first resistor $e'$ is intended to limit the feedback factor and the second resistor $e''$ which is wound with copper wire is intended to eliminate drift resulting from temperature variations in the transistor $T_1$. By-pass capacitors 13, 14 are associated with said resistors. The input voltage $\overline{E}$ is rendered constant by means of a Zener diode $E_0$ which is associated with a polarizing resistor 25. As in the previous example, the signal $\overline{u}$ which is collected at the terminals of the resistor 3 and which is fed back via the conductors 11 and 12 is opposed to the voltage $\overline{E}$.

The circuit of the windings $S_1$ and $S_2$ is adapted to deliver a voltage $\overline{S}_1$, the sign of which serves to discriminate the direction of displacement of the core 22. This circuit accordingly comprises two rectifiers 26, 27 which are associated with resistors 28, 30. There is thus developed across the terminals of the capacitor 29 a rectified voltage $\overline{S}_1$, the value and sign of which depend on the amplitude and the direction of displacement of the core 22. A capacitor 31 serves to match the windings $S_1$ and $S_2$ and consequently to increase the voltage $\overline{S}_1$.

A circuit arrangement of this type makes it possible, for example, in the case of an oscillator which is tuned to a frequency of 5000 c./s. to obtain with a very low power consumption a voltage $\overline{S}_1$ of 8 volts/mm. in the case of a length of travel of the core 22 of 1 mm., for example, which corresponds to a very high degree of sensitivity. Moreover, the cost price of the device is much lower than would be the case if the differential transformer were fed from a conventional stabilized supply.

It is apparent that, instead of a differential transformer of the rectilineal displacement type, the windings P, $Q_1$, $Q_2$, R, $S_1$, $S_2$ can be associated with any system for producing a variation of air-gap or of coupling between the windings by displacement of a magnetic component.

Figures 4, 5:
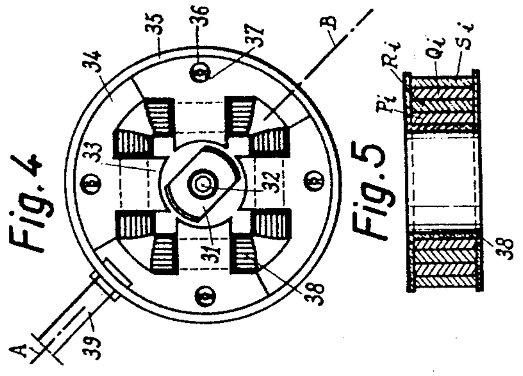
FIG. 4 is a view in side elevation of another differential transformer.
FIG. 5 is a sectional view of a winding.

There is accordingly shown in FIG. 4 an angular displacement detector which can be employed, for example, in the case of angular variations of a core 31 carried by a shaft 32, said variations being equal to ±30° on each side of the zero position AB.

The stator member comprises four radial teeth such as the teeth 33 which are spaced at angular intervals of 90° and obtained by cutting-out sheet metal discs forming an annular frame 34 which is clamped in a ring 35 and held in position by means of tie-rods 36 fitted with nuts 37.

Figures 6, 7:
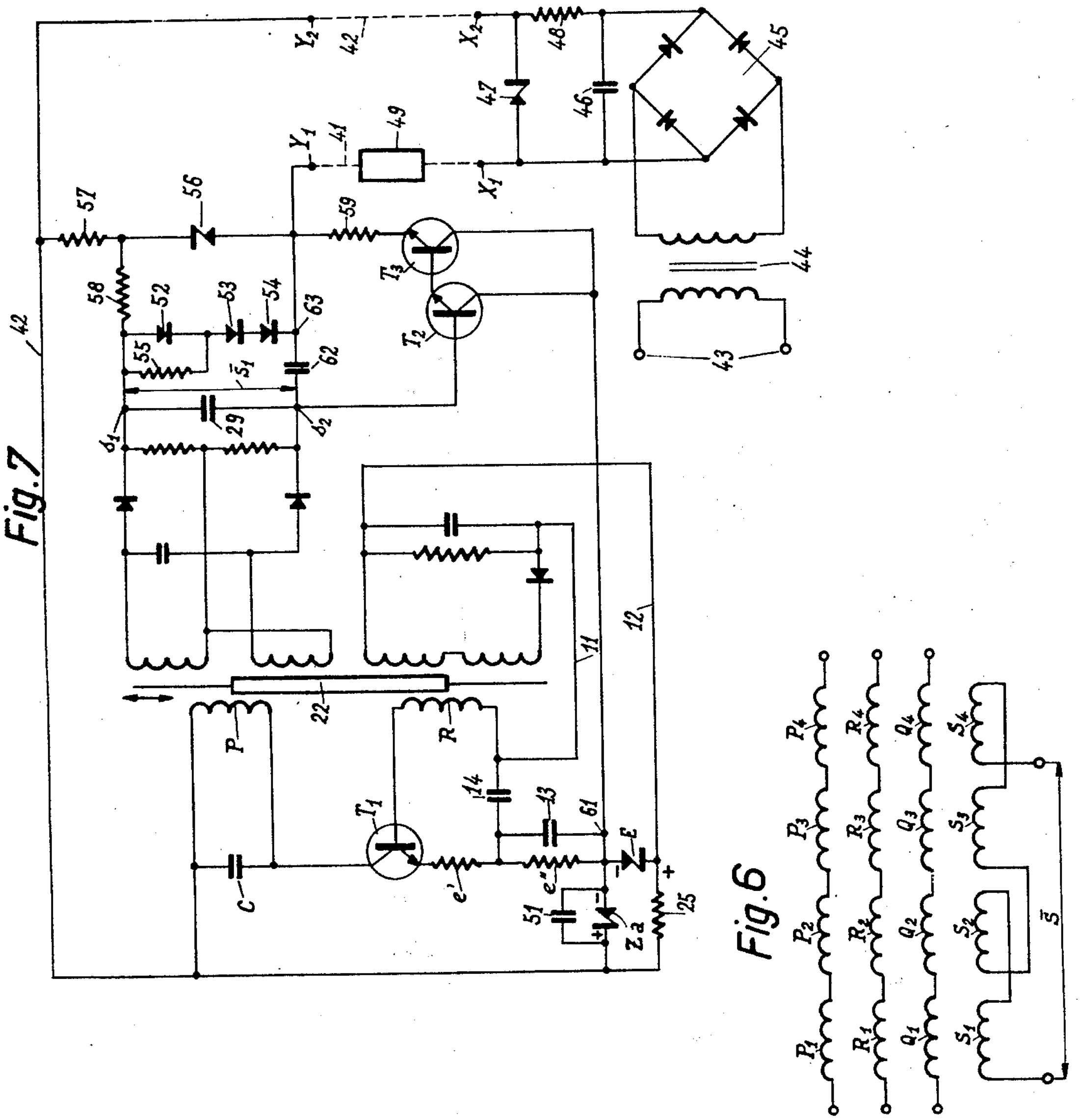
FIG. 6 is a diagram of the windings of the transformer of FIGS. 4 and 5.
FIG. 7 is a diagram showing one particular industrial application of the device.

As shown in FIG. 5, a coil unit 38 is fitted over each tooth 33 and comprises four windings $P_i$, $Q_i$, $R_i$, $S_i$ (wherein the index $i$ varies from 1 to 4) which are connected as shown in FIG. 6, the windings $P_i$, $Q_i$, $R_i$ being connected in series and the windings $S_i$ being opposed in pairs. The connections of the electromagnetic detector which is thus designed are made by means of a multiple conductor cable 39.

The circuit arrangement of FIG. 7 shows the application of the invention to the remote measurement of a translational displacement by means of a so-called "two wire" direct-current transmission system constituted solely by the two conductors 41, 42 which can virtually be of any desired length and extend between the terminals $X_1$, $X_2$ which are located on the feed side and the terminals $Y_1$, $Y_2$ on the measuring side. For example, the supply source can be located in a control room and the measurement conversion device can be located in proximity to a measuring instrument.

This arrangement makes it possible in particular to take remote measurements of level, of absolute or relative pressure, of elongation and of flow by differential pressure.

Power is supplied from the mains (terminals 43) via a transformer 44 and then via a bridge rectifier 45, the output voltage of which is smoothed by the capacitor 46 and stabilized by the Zener diode 47 across the resistor 48.

A load 49 constituted by one or a number of receiving devices such as a recorder, regulator and the like is inserted in one of the conductors such as the conductor 41 of the two-wire circuit, between the supply and the measurement converter.

On the measuring side, the device comprises an assembly which is similar to that of FIG. 3 but differs therefrom in that the supply voltage A is obtained in this case by means of a Zener diode $Za$ which is shunted by a bypass capacitor 51, the input voltage $\overline{E}$ being provided as in the previous example by the Zener diode E.

The output voltage $\overline{S}_1$ which is proportional to the displacements $Dx$ of the core 22 is again impressed across the terminals $s_1$, $s_2$ of the capacitor 29 as in the case of FIG. 3. Inasmuch as the power is very low, the device comprises between the terminals $s_1$, $s_2$ and the terminals $Y_1$, $Y_2$ a D.C. amplifier comprising the two transistors $T_2$, $T_3$ which are associated in a Darlington circuit, the input of said amplifier being connected to the terminals $s_1$, $s_2$. The transistors $T_2$, $T_3$ are supplied by means of a polarizing bridge comprising the rectifiers 52, 53, 54 which are connected in series and the resistor 55 which is in parallel with the diode 52 relatively to a Zener diode 56 which is connected to the conductor 42 through a resistor 57, to the preceding circuit through a resistor 58 and to the emitter of the transistor $T_3$ through a feedback resistor 59. The base of the transistor $T_2$ is connected to the terminal $s_2$ and the collectors of the transistors $T_2$, $T_3$ are connected to the terminal 61 which is common to the Zener diodes E and $Za$. The circuit is completed by a capacitor 62 which is connected between the terminal $s_2$ and the terminal 63 which serves to connect the diode 54 to the conductor 41.

The operation of the device is as follows:

The oscillator (transistor $T_1$), the D.C. amplifier (transistors $T_2$, $T_3$) and the load 49 are supplied in series from the voltage provided by the Zener diode 47.

The polarizing circuit is supplied with the current which flows through the load 49 across the resistors 57 and 58. The design function of this circuit is to trigger the D.C. amplifier when no direct current voltage is developed at the terminals $s_1$, $s_2$ and to compensate for the temperature coefficients of the base-emitter junctions of the transistors $T_2$, $T_3$. The voltage developed at the terminals $s_1$, $s_2$ is thus distributed between the feedback resistor 59 and the base-emitter junctions of the transistors $T_2$, $T_3$. Owing to the high gain of the amplifier and to the fact that the dynamic resistance of the polarizing bridge is low, all the variations of the voltage $\overline{S}_1$ thus appear at all the terminals of the resistor 59. Inasmuch as this resistor is stable, the current which passes through it is proportional to the voltage $\overline{S}_1$ and therefore to the displacement $Dx$ of the core 22.

In the final analysis, the current which is present in the load 49 is equal to the current which is present in the resistor 59 as increased by the current in the polarizing bridge.

To within the nearest constant, the current which is present in the load 49 is therefore proportional to the displacement $Dx$. Compared with the supply current, the D.C. amplifier operates as a variable resistor as a function of the displacement of the core 22 and regulates the current which is present in the load 49.

Inasmuch as the direct current which is passed through the oscillator $T_1$ is independent of the measurement, the Zener diode plays the part of a variable resistor in addition to its stabilizing function and accordingly permits of variation in the D.C. supply inasmuch as its equivalent resistance is largely dependent on the voltage developed across its terminals.

It is therefore apparent that the direct current delivered across the terminals $X_1$, $X_2$ permits the operation of the different circuits whilst its value is proportional to the displacement of the core 22.

The advantage of this system lies in the fact that it permits the remote measurement of a displacement in an economical manner (inasmuch as it only requires two line wires, the natural resistance of which has no influence) as well as the possibility of restoring the measurement at all points of the line.

It is obvious that, instead of connecting the oscillator (transistor $T_1$) and the D.C. amplifier (transistors $T_2$, $T_3$) in series, it would be possible to mount them in parallel, the load 49 being in series with this parallel-connected group. In this case, the return of the oscillator must be connected between the emitter of the transistor $T_3$ and the load 59, in which case the Zener diode $Za$ can be dispensed with. In effect, the virtually constant current of the oscillator will pass through the resistor 59 but, in view of the fact that the variations in voltage across the terminals of said resistor are equal to the variations of the voltage $\overline{S}_1$, the measuring current will always be the image of the displacement of the core 22.

The invention also comprises a device for the remote measurement of the mass flow of a fluid through a pipe 91 (as shown in FIG. 8), said device being constituted by the combination of the measurement converter in accordance with FIG. 3 and the two-wire transmission system in accordance with FIG. 7.

It is known that the mass flow Q is given by the following formula:

$$Q=K\left(\frac{ph}{t}\right)^{1/2} \qquad \text{(I)}$$

wherein K is a coefficient which is a function of the pressure-reducing element and of the fluid $p$ is the absolute pressure of the fluid $t$ is the absolute temperature of the fluid $h$ is the differential pressure or pressure difference between the upstream side and downstream side of the pressure-reducing element 92 which is disposed within the pipe 91.

This remote measurement device is generally in conformity with the block diagram of FIG. 8 which comprises in a cascade-connected arrangement:

A detector 93 (differential manometer) for measuring the pressure $h$, said detector being adapted to control a measurement converter $Z_1$ which delivers a D.C. voltage or current which is proportional to the measurement $h$. Associations of the type under consideration (detector 93, converter $Z_1$) can be constructed in a large number of different ways which are well known to those versed in the art, the only condition which is imposed being the need to produce an electric signal which is proportional to $h$. The arrangement which is contemplated by the invention is thus applicable irrespective of the structural arrangement adopted for the stages 93 and $Z_1$.

A feedback amplifier $Z_2$ in which the feedback system comprises an element which is responsive to the temperature $t$ of the fluid. Said amplifier delivers a signal which is proportional to $h/t$.

The temperature-responsive element which influences the amplifier $Z_2$ is constituted by a probe 62 which is disposed within the pipe 90 and formed of a resistance having a temperature coefficient which is not zero. The probe 62 is connected to the amplifier $Z_2$ by means of the conductor 95.

A pressure-measuring apparatus $Z_3$ which is controlled by a manometric detector 96 and which makes it possible to effect the multiplication of the electrical value $h/t$ by another electrical value which is representative of the pressure $p$. The apparatus $Z_3$, as will be explained later, is constituted by a measurement converter with differential transformer in accordance with the arrangement of FIG. 7.

A square-root extracting operational amplifier $Z_4$ which actuates a restoring apparatus 88 (pointer-type indicator or recorder, digital apparatus and so forth).

The amplifier $Z_4$ can be located at any distance from the stages $Z_1$ to $Z_3$ by virtue of the properties of the two-wire transmission system, as will be brought out hereinafter.

The arrangement of the stage $Z_3$ in the chain of known elements $Z_1$, $Z_2$, $Z_4$ endows the device with very favorable advantages in regard to the accuracy of measurements and ease of operation. The arrangement is further characterized in that the stage $Z_3$ can be associated with stages $Z_1$, $Z_2$, $Z_4$ which can have any structural arrangement under the conditions stated in the foregoing, thereby providing the invention with a wide range of potential uses.

As is clear from a study of Formula I which expresses the mass flow, the order in which the factors $h$, $p$ and $t$ are introduced is indifferent. It is possible in particular to place at the head of the measuring apparatus pressures which supply the signal $p$, which can accordingly be of any known type. In this case, the stage $Z_3$ no longer supplies the absolute pressure but the differential pressure $h$.

One mode of construction of the flow meter in accordance with FIG. 8 is shown in detail in FIG. 9. The transducer $Z_1$ which is controlled by the differential manometer 93 supplies a voltage $\overline{S}_1$ which is proportional to $h$. These elements have not been shown in detail since they can be constructed in a variety of different ways which are well known to those skilled in the art as has already been stated.

The amplifier $Z_2$ which receives the signal $S_1$ comprises, for example, two transistors $T_{16}$, $T_{15}$ and comprises within the feedback circuit the resistance probe 62 which is responsive to temperature and in heat-conducting relation with the fluid flowing through the pipe 91.

The transistors $T_{16}$, $T_{15}$ are mounted in such a manner that the base-emitter junctions in voltage opposition are mutually cancelled. The emitter current of the transistor $T_{15}$ is equal to the input voltage $\overline{S}_1$ divided by the resistance of the probe 62. Said current is therefore proportional to the differential pressure $h$ and is inversely proportional to the tempertature $t$ inasmuch as the resistance of the probe 62 is proportional to $t$. Inasmuch as the output voltage $\overline{S}_2$ which is generated by the collector current of $T_{15}$ in the resistor 74 is practically equal to the aforesaid emitter current, the voltage $\overline{S}_2$ is in fact proportional to $h/t$.

The voltage $\overline{S}_2$ constitutes the input signal of a measurement conversion device $Z_3$ with differential transformer which is of similar design to the device of FIG. 7, the only difference being that the Zener diode E which defines the input voltage is replaced in this example by the conductors 76 for providing a connection with the previous output $\overline{S}_2$.

The stage $Z_3$ comprises a differential transformer 77, the moving core 78 of which is coupled to the manometric detector 96 which is responsive to the absolute pressure $p$. Inasmuch as the signal $\overline{S}_2$ is proportional to $h/t$, the output signal $\overline{S}_2$ is proportional to $(p,h/t)$, taking into account the multiplying properties of the circuit arrangement which have been discussed earlier. The voltage $\overline{S}_3$ is applied to a transistor amplifier $T_{17}$, $T_{18}$ in accordance with an arrangement which is similar to the two-wire transmission system previously described.

The output voltage $\overline{S}_4$ which is taken from the terminals of the resistor 79 of the above-mentioned amplifier is applied to the input terminals 89 of a transistorized quadratic rectifier $Z_4$ which is located at any indeterminate distance from the preceding stages.

The aforesaid rectifier $Z_4$ is essentially constituted by a non-linear amplifier which delivers an output signal $\overline{S}_5$ which is proportional to $(\overline{S}_6)^{1/2}$. This condition is obtained by connecting into the feedback chain of an amplifier comprising two transistors $T_{19}$, $T_{20}$ a network consisting of resistors 81, 82 and diodes 83 which operate in the portion of their characteristic curve which corresponds to the flexion point.

There are added to these components circuits for polarization, compensation for temperature and regulation of zero points of measurements (resistors 84, 85 etc.)

The voltage $\overline{S}_5$ which is taken from the terminals 86 of the measuring circuit is applied to the load resistor 87 with which an ammeter 88 is connected in series.

The essential property of this arrangement is that the measuring and computing operations are carried out from direct current supplies, thereby dispensing with costly transmission cables. Moreover, by virtue of the arrangement referred to, the majority of existing detectors can be employed for the purpose of measuring the differential pressure (or the absolute pressure if the corresponding stage is a head stage).

It would not constitute a departure from the scope of this invention to replace the detectors for the measurement of absolute pressure and temperature by a detector which provides a direct measurement of density.

In this case, the amplifier $Z_2$ of FIG. 9 is no longer provided and the differential transformer 77 of the device $Z_3$ must be actuated by a detector which is known per se, whereby the density of the fluid is represented in the form of a displacement.

An even more special circuit system for providing a flow meter which serves to determine the mass flow of a fluid is shown in FIGS. 10*a*, 10*b*.

Said flow meter thus comprises a converter stage $M_1$ which is similar to the circuit system of FIG. 7 described hereinabove and constituted by a controlled oscillator which is again shown to comprise the transistor $T_{11}$, a differential transformer 71, the transformer core 72 being coupled to a moving component which is responsive to the absolute pressure $p$ within the pipe (not shown). The output voltage $\overline{S}_1$ across the terminals of the capacitor 73 is solely proportional to the displacement of the core 72 and consequently to $p$.

The voltage $\overline{S}_1$ is amplified by a D.C. amplifier (transistors $T_{12}$, $T_{13}$) of the series negative current-feedback type in accordance with a circuit arrangement which is similar to that provided in the case of FIG. 7.

The output current produces at the terminals of the resistor 70 a voltage $\overline{S}_2$ which is proportional to $\overline{S}_1$ and fed via the conductors 60 to the stage $M_2$ which is similar to the amplifier $Z_2$ of the previous example.

The output voltage $\overline{S}_3$ of the stage $M_2$ constitutes the input signal of a stage $M_3$ of the type contemplated in the above-cited French patent application and which comprises an isolating transformer 75 having four windings $P_0$, $Q_0$, $R_0$, $S_0$ and a controlled oscillator transistor $T_{16}$.

The rectified output voltage $\overline{S}_4$ of the stage $M_3$ which is delivered by the winding $S_0$ is proportional to the input voltage $\overline{S}_3$ but independent of variations in ambient temperature and in supply voltages.

The voltage $\overline{S}_4$ constitutes the input signal of a stage $M_4$ or measurement conversion device with differential transformer which is similar to the device of FIG. 7 except that the Zener diode E which defines the input voltage is replaced in this case by the conductors 76 which provide a connection with the above-mentioned winding $S_0$.

The stage $M_4$ comprises a differential transformer 77, the moving core 78 of which is coupled to a member which is responsive to the differential pressure *h*. Inasmuch as the signal $\overline{S}_4$ is proportional to $p/t$, the output signal $\overline{S}_5$ is proportion to $(p,h/t)$, taking into account the multiplying properties of the circuit system which have been mentioned above. The voltage $\overline{S}_5$ is applied to a transistor amplifier $T_{17}$, $T_{18}$ in accordance with an arrangement which is similar to the two-wire transmission system contemplated heretofore.

The output voltage $\overline{S}_6$ which is taken at the terminals of the resistor 79 and which is proportional to $(p,h/t)$ is applied to the input terminals 80 of a transistorized quadratic rectifier (stage $M_5$) which is identical with the stage $Z_4$ of FIG. 9 and delivers and ouput signal $\overline{S}_7$ which is proportional to $\overline{S}_6^{1/2}$.

The voltage $\overline{S}_7$ which is taken from the terminals 86 of the measuring circuit is applied to the load resistor 87 to which an ammeter 88 is connected in series.

What I claim is:

1. A measurement conversion device for producing a voltage which is proportional to the displacement of a moving component relatively to a reference position, wherein said device comprises a differential transformer comprising at least three pairs of windings which are inductively coupled by means of a moving magnetic core whose position is controlled by the moving component aforesaid, a first pair of windings of said transformer being associated respectively with an oscillating circuit and with a circuit for sustaining the oscillations of an oscillator system, a second series-connected pair of windings of the transformer being adapted to supply a voltage which is independent of the travel of the core and which is opposed to an input voltage applied to the device, the third pair of windings which is connected in opposition and influenced differentially by the magnetic core as a function of its position being adapted to deliver an output voltage which is proportional to the product of the input voltage and of the displacement of the core relatively to the reference position thereof and which is practically independent of any variations which might affect the other elements of the device.

2. A device as defined in claim 1, wherein the pair of windings of the differential transformer which are associated with the oscillator is mounted relatively to the moving core in such a manner that the coupling thereof is not influenced by the displacements of said core.

3. A device as defined in claim 1, wherein the windings of the differential transformer constitute a tubular volume and an elongated magnetic core is adapted to move along the axis of said volume.

4. A device as defined in claim 3, wherein the two pairs of windings which are influenced differently by the the magnetic core as a function of its position are disposed symmetrically on each side of the reference position of said core and in the vicinity of the ends of said core when it takes up said reference position.

5. A device as defined in claim 1, wherein the pair of windings which are connected in opposition delivers into a circuit comprising rectifiers, load resistors and a smoothing capacitor so as to deliver an output voltage having a continuous characteristic, the sign of which is dependent on the direction of displacement of the core relatively to its reference position.

6. A device as defined in claim 1, wherein the circuit which supplies the input voltage is coupled to the voltage source which supplies the oscillator and comprises electronic means for stabilizing said voltage such as a Zener diode, with the result that the output voltage of the device is solely dependent on the position of the core.

7. A device as defined in claim 1, wherein the transformer comprises a rotating magnetic core and an assembly of coil units mounted on radial magnetic teeth, the number of windings of each coil unit being equal to the number of magnetic teeth, these different windings being connected in series from one coil unit to the next except for the output circuits whose windings are connected in opposition in pairs.

8. A device as defined in claim 1, wherein the input signal is constituted by an electric measuring signal, with the result that the output signal is proportional to the product of said measuring signal and of the displacement of the core.

9. A device as defined in claim 1, wherein the circuit which is connected to the output windings of the differential transformer comprises a direct-current amplifier which is associated with a diode polarizing-bridge, the complete assembly being supplied from a direct current source by means of two conductors, the amplifier being adapted to constitute a variable resistance with respect to the supply current as a function of the displacement of the core, thereby permitting a two-wire transmission between the converter and the supply source, a receiving apparatus being inserted in at least one of said wires.

10. A measurement conversion device as defined in claim 1 for the purpose of measuring the mass flow of a fluid flowing through a pipe and comprising means responsive to differential pressure, means responsive to absolute pressure and means responsive to temperature, wherein the input circuit of the measurement converter is influenced by one of the means responsive to pressure and by the means responsive to temperature, with the result that the input signal is proportional to the ratio of one of said pressures to the temperature, and wherein the magnetic core is positionally controlled by the means which are responsive to the other pressure.

11. A device as defined in claim 10, wherein the means responsive to differential pressure comprise a differential manometer which controls a measurement converter for supplying a direct current voltage which is proportional to said differential pressure, said converter being connected in series with a feedback amplifier and the feedback circuit of which comprises a resistor which is responsive to variations of temperature and which is in heat-conducting relation with the fluid flow pipe.

12. A measurement conversion device as defined in claim 1 for the purpose of measuring the mass flow of a fluid flowing through a pipe, said device comprising means responsive to differential pressure for supplying an input signal which is proportional to said pressure and means which are responsive to the density of the fluid wherein the input circuit of the converter is supplied by said means which are responsive to differential pressure and wherein the magnetic core is positionally controlled by the means which are responsive to density.

References Cited

UNITED STATES PATENTS

| | | | |
|---|---|---|---|
| 2,992,373 | 7/1961 | Golding | 340—199 XR |
| 3,140,475 | 7/1964 | Spencer et al. | 340—282 XR |
| 3,185,973 | 5/1965 | Garber | 323—51 XR |
| 3,225,289 | 12/1965 | Koppel et al. | 323—51 |
| 3,412,387 | 11/1968 | Millar | 323—51 XR |

FOREIGN PATENTS

| | | |
|---|---|---|
| 935,223 | 8/1963 | Great Britain. |

JOHN S. HEYMAN, Primary Examiner
STANLEY T. KRAWCZEWICZ, Assistant Examiner

U.S. Cl. X.R.

307—309; 323—51; 324—34; 328—1, 5; 340—199